(12) United States Patent
Bader et al.

(10) Patent No.: US 7,603,200 B2
(45) Date of Patent: *Oct. 13, 2009

(54) METHOD AND SYSTEM FOR ASSESSING THE STATE OF AT LEAST ONE AXIAL JOINT

(75) Inventors: Axel Bader, Friedberg (DE); Sven Hansen, Berstadt (DE); Steffen Schmidt, Aalen (DE); Kim Henrich, Gelnhaar (DE)

(73) Assignee: ABB Patent GmbH, Ladenburg (DE)

( * ) Notice: Subject to any disclaimer, the term of this patent is extended or adjusted under 35 U.S.C. 154(b) by 804 days.

This patent is subject to a terminal disclaimer.

(21) Appl. No.: 11/153,041

(22) Filed: Jun. 15, 2005

(65) Prior Publication Data

US 2005/0278067 A1   Dec. 15, 2005

(30) Foreign Application Priority Data

Jun. 15, 2004   (DE) .................. 10 2004 028 557

(51) Int. Cl.
*G06F 19/00* (2006.01)
*G05B 9/02* (2006.01)
*G06F 11/00* (2006.01)

(52) U.S. Cl. .................. 700/245; 700/175; 318/566; 702/179; 702/183; 33/1 MP

(58) Field of Classification Search ................. 318/566; 702/179, 183; 700/245, 175; 33/1 MP
See application file for complete search history.

(56) References Cited

U.S. PATENT DOCUMENTS

| | | | | |
|---|---|---|---|---|
| 4,676,002 A | * | 6/1987 | Slocum | 33/1 MP |
| 5,424,960 A | | 6/1995 | Watanabe et al. | |
| 5,568,028 A | * | 10/1996 | Uchiyama et al. | 318/566 |
| 5,857,166 A | * | 1/1999 | Kim | 702/179 |
| 5,949,678 A | | 9/1999 | Wold et al. | |
| 7,010,386 B2 | * | 3/2006 | McDonnell et al. | 700/175 |
| 7,316,170 B2 | * | 1/2008 | Bader et al. | 73/865.9 |
| 7,359,830 B2 | * | 4/2008 | Hupkes et al. | 702/182 |

(Continued)

FOREIGN PATENT DOCUMENTS

DE   101 20 943 A1   11/2002

(Continued)

*Primary Examiner*—Dalena Tran
*Assistant Examiner*—Ian Jen
(74) *Attorney, Agent, or Firm*—Laurence A. Greenberg; Werner H. Stemer; Ralph E. Locher

(57) ABSTRACT

A method assesses a state of at least one axial joint of an industrial robot, on the basis of data of a mechanical backlash present at the axial joint of the industrial robot, a state of wear of the axial joint being determined. On the basis of data of a torque profile, a first loading state of the axial joint is determined at the axial joint during at a first working cycle of the industrial robot. On a basis of data of a movement sequence at the axial joint during a second working cycle of the industrial robot, a second loading state of the axial joint is determined. An assessment of the state is carried out by pre-assessing the state of wear, the first loading state and the second loading state and a subsequent comparison with an empirically obtained comparison value matrix.

21 Claims, 7 Drawing Sheets

U.S. PATENT DOCUMENTS

2004/0210352 A1   10/2004   Bayer et al.
2005/0278067 A1* 12/2005   Bader et al. ................. 700/245
2005/0278148 A1* 12/2005   Bader et al. ................. 702/183
2007/0137370 A1*  6/2007   Ichibangase et al. ..... 74/490.01

FOREIGN PATENT DOCUMENTS

| EP | 0 625 651 B1 | 1/1997 |
| EP | 0 794 475 A1 | 9/1997 |
| EP | 1 406 137 A2 | 4/2004 |

* cited by examiner

METHOD AND SYSTEM FOR ASSESSING THE STATE OF AT LEAST ONE AXIAL JOINT

BACKGROUND OF THE INVENTION

Field of the Invention

The invention relates to a method and a system for assessing the state of at least one axial joint of an industrial robot.

It is generally known that, on industrial robots, the axial joints of a robot arm have to be periodically checked for their wear. This usually takes place in specific servicing work at fixed servicing intervals, the service personnel merely establishing whether service work intended as part of a servicing measure has to be performed on the axial joints, or whether the axial joints can be expected to get by until the next service interval without servicing. On the other hand, however, routine servicing work, for example the regular changing of transmission oil, is also carried out on the axial joint.

The time period between two servicing times is generally defined on the basis of a specific number of operating hours for the robot. An individual consideration of the actual tasks or work performed by the industrial robot does not take place.

SUMMARY OF THE INVENTION

It is accordingly an object of the invention to provide a method and a system for assessing the state of at least one axial joint which overcomes the above-mentioned disadvantages of the prior art methods and devices of this general type, in which the work actually performed by the industrial robot is taken into account.

Accordingly, the method according to the invention for assessing the state of at least one axial joint of an industrial robot has the now described method steps. On the basis of data of a mechanical backlash present at the at least one axial joint of the industrial robot, a state of wear of the at least one axial joint is determined. On the basis of data of a torque profile at the at least one axial joint during at least one first working cycle of the industrial robot, a first loading state of the at least one axial joint is determined. Furthermore, on the basis of data of a movement sequence at the at least one axial joint during at least one second working cycle of the industrial robot, a second loading state is determined. Finally, the assessment of the state is carried out by pre-assessing the state of wear, the first loading state and the second loading state and subsequent comparison with an empirically obtained comparison matrix.

Accordingly, the method according to the invention works on the basis of actually measured or determined data of the industrial robot during its working cycles. Serving here as the data basis is the mechanical backlash, the torque profile and the movement sequence of the robot. The result of the assessment of the state may in a simple case comprise the statement that the at least one axial joint is or is not still working within permissible parameters. However, this statement can be made in a more differentiated form, for example to include an indication of time periods within which the axial joint may for example continue to be operated without servicing.

The data of the torque profile and the movement sequence do not have to originate from the same working cycle. In this way it is possible for the necessary data for the method according to the invention to be progressively obtained from the robot. However, it is also covered by the idea of the invention that, with appropriate equipment, the necessary data are also obtained in parallel, that is to say within the same working cycle or the same working cycles.

The state of wear is understood in particular as meaning an indication of the existing mechanical backlash, as it is present at the time on the axial joint concerned. The loading state is to be understood as meaning the analysis of the torques acting on the axial joints and the movement requirements as a result of the work of the robot.

Altogether, the method according to the invention for assessing the state creates an assessment capability that takes into account both the actual wear and the actual loads of the robot.

An advantageous form of the method according to the invention is characterized in that a load-transmitting device applies a predetermined force alternately along a measuring line to a first robot knuckle, movably connected in a direction of rotation by an axial joint to a second robot knuckle respectively to the free end of a robot arm. A displacement sensor measures the deflection of the first robot knuckle at a predetermined distance from the axis of rotation of the axial joint, and an evaluation device connected to the displacement sensor calculates a rotational angle of the first robot knuckle as a measure of a backlash present at the axial joint, taking into account the geometrical arrangement data in the measurement of the displacement sensor and the industrial robot and also the measured deflection.

An advantageous form of the method according to the invention by which the data for determining the state of wear are obtained is given above.

The object is also achieved by a system according to the invention for assessing the state of at least one axial joint of a robot arm of an industrial robot. The system includes a data module that contains the data of an existing mechanical backlash, a torque profile and a movement sequence of at least one axial joint during at least one working cycle of the industrial robot, and an analysis module, by which loading states and/or states of wear can be determined on the basis of the data. In addition, the system has an assessment module, by which an assessment of the states determined is made possible, in particular by pre-assessment of the state of wear, the first loading state and the second loading state, and subsequent comparison with an empirically obtained comparison matrix.

The data module therefore contains actual data of the mechanical backlash of the torque profile and of the movement sequence, which can then be analyzed with the analysis module. In this way it is possible for an assessment module to use the analyzed data as a basis for an assessment of the state. The assessment statements made are therefore made on the basis of actual loads or actual states of wear.

In principle, this system makes possible a series of assessment capabilities, considered by a person skilled in the art to be appropriate case-specifically. One favorable assessment capability is that of comparing the states respectively found, that is the state of wear, the first loading state and the second loading state, with reference values. The reference values are, for example, noted in a so-called comparison value matrix, the values of which have been empirically found. The comparison value matrix in this case contains for example a common value, which is to be compared for the comparison with a common state value of all three states, or three different groups of values, which respectively assign the comparison values to a state, that is the state of wear, the first loading state or the second loading state. In the case of the last-mentioned variant, it is possible, depending on the established combination of the three results of the individual states, to draw conclusions concerning the way in which detected wear came about or to generate recommendations on how such wear, possibly a surprisingly high degree of wear, can be avoided in future. This is achieved for example by proposing for an above-average element of movement of a specific axial joint alternative paths of movement of the robot arm, which however represent the same working purpose within the working cycle of the industrial robot.

In an advantageously compact form of the system according to the invention, the data module, the analysis module and the assessment module are disposed in a robot controller. In addition, it is also possible to distribute the individual modules between different devices. Appropriate for this for example are an evaluation device in the form of a measuring computer or existing evaluation devices within an instrumentation and control network, as are frequently used for the overall control of robot installations.

Other features which are considered as characteristic for the invention are set forth in the appended claims.

Although the invention is illustrated and described herein as embodied in a method and a system for assessing the state of at least one axial joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
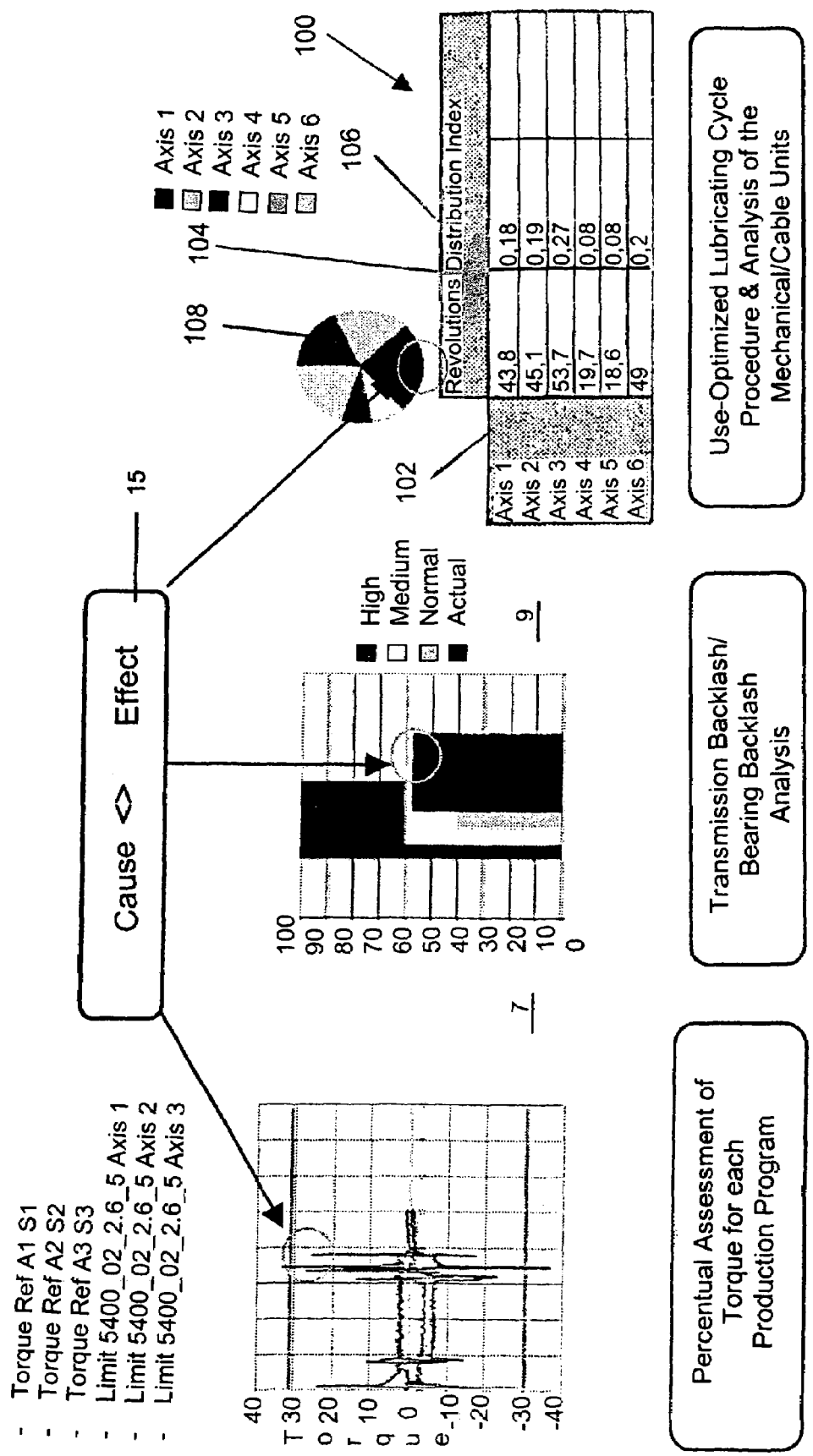
FIG. 1 is an illustration showing an overview of a method according to the invention.

Referring now to the figures of the drawing in detail and first, particularly, to FIG. 1 thereof, there is shown an overview of a method according to the invention for assessing a state of axial joints on robots. In this case, three main working steps of the method according to the invention which determine the individual states are represented in a first diagram 7 for the determination of a first loading state, a second diagram 9 for the determination of a state of wear and a third diagram 11 for the determination of a second loading state. To symbolize a further method step of the method according to the invention, a bordered text field is schematically shown, indicating by the arrows 15 that in this method step specific data or determined state values are accessed and used for assessing the state of the at least one axial joint.

The individual diagrams 7, 9, 11 are now explained.

Diagram 7 shows the representation of torque profiles of three different robot axes. Here, a first, a second and a third torque profile are represented on a time axis, which indicates the variation over time of the torque signals in seconds. The y-axis of the graph is plotted as a torque axis, normalized to a maximum value which corresponds to a percentage loading of 100%, in such a way that the different axes of the robot can also be comparatively represented in a graph. The different axes of the robot are usually configured completely differently with respect to their type of construction, their drive, their performance, their transmission and so on, so that, although plotting in absolute values would be possible, it would be very confusing and in any event lead to an unfavorable representation. Also entered in the graphs is an upper limit value and a lower limit value, the limit values, each at approximately 30%, that is on the one hand plus 30% and on the other hand minus 30%, describing a torque band, which is also referred to as a normal band. Therefore, no particular wear is to be expected at the robot axes if the torque profile remains within the band described.

For two of the three torque profiles, this is also always the case. The first torque profile, however, has a first point and a second point at which the band is exceeded. These points are of particular interest for the wear appraisal of axes. The assessment of current axial wear can therefore be performed on the basis of various criteria.

One possibility is to count the number of those points, such as the points that exceed the normal band. The occurring frequency of these events is in this case a measure of the wear of the axis concerned.

A further possibility is to use the maximum torque occurring in relation to a current torque with the inclusion of axis-specific parameters, that is empirical values, as a measure for assessment. To be regarded in particular as the current torque in this case is a mean value of torque values, which may be regarded as an arithmetic mean value over the entire measuring time period of the working cycle, or a selective mean value, which is obtained from the loading at rest, that is loading of the robot axis in the basic state of the robot without a work task.

A further possibility of assessment is to use the number of opposing maximum values when moving to a coordinate within a working cycle as a measure of assessment for wear appraisal. Yet another possibility is to consider a trend comparison of the values of the friction of a powered unit, that is in particular the motor, transmission and robot arm, within a movement from one coordinate within the working cycle of the robot to a second coordinate. However, still further values and data from the robot control, not described here in any more detail, also have to be included in the consideration for this. The individual values to be considered are, however, familiar to a person skilled in the art.

The diagram 9 shows the example of an assessed axial backlash measurement on the basis of an evaluation diagram. Assessed axial backlash measurement means that direct measured values or filtered measured values, that is measured values selected or prepared in some form or other, are additionally weighted with a special factor.

So it is in this example too. Here, the measured backlash has been normalized on the coordinate axis to a percentage number between 0 and 100%, a 0% value corresponding to a backlash of 0 mm and 100% corresponding to a maximum backlash, which in principle can be arbitrarily predetermined. Therefore, a first column corresponds to a maximum backlash at 100%. It is possible for example to fix this as a value at which it is found from experience that the limit where actually existing wear restricts or even disrupts the operation of the robot is reached. In the figure, this is represented by a second column, which has a height of 60%. An actually measured axial backlash and its assessment is represented by a third column, which lies at approximately 40%. Also shown is a fourth column, which represents an already existing first backlash in the case of a new robot.

The assessment of an axial backlash measurement has special advantages. On the one hand, an actually measured absolute wear value has the disadvantage that the absolute value alone is not very informative, since the minimum and maximum values for the wear range must also be known to allow the statement as to whether the measured value is within allowed limits to be made. These maximum and minimum values are in turn individually dependent on the respective axis on the robot and also on the type of construction and the loading and so on. In this way, the operating personnel would have to know a large number of values in order to devise a comprehensive picture of the state of wear of the robot with a large number of different axes on the basis of the absolute measured values.

It is also possible in an assessed consideration of backlash measurement to allow empirical findings, available in particular to the service personnel of the robot manufacturer, to be included in the assessment factor, in order in this way to take further boundary conditions of the use of the robot into account, for example the type of task that the robot has to perform, or the programmed movement sequence that the robot undertakes in its work. In this way, the assessment factor once again has an influence on the result, whether the absolute backlash measurement concerned already represents impermissible wear or can still be tolerated. A further advantage is that the wear limits, that is the minimum and maximum values within which measured wear is ideally located, can always be fixed to the same % limit in a percentage indication of the assessed backlash measurement, and so are conducive to user-friendly operation.

Figure 7:
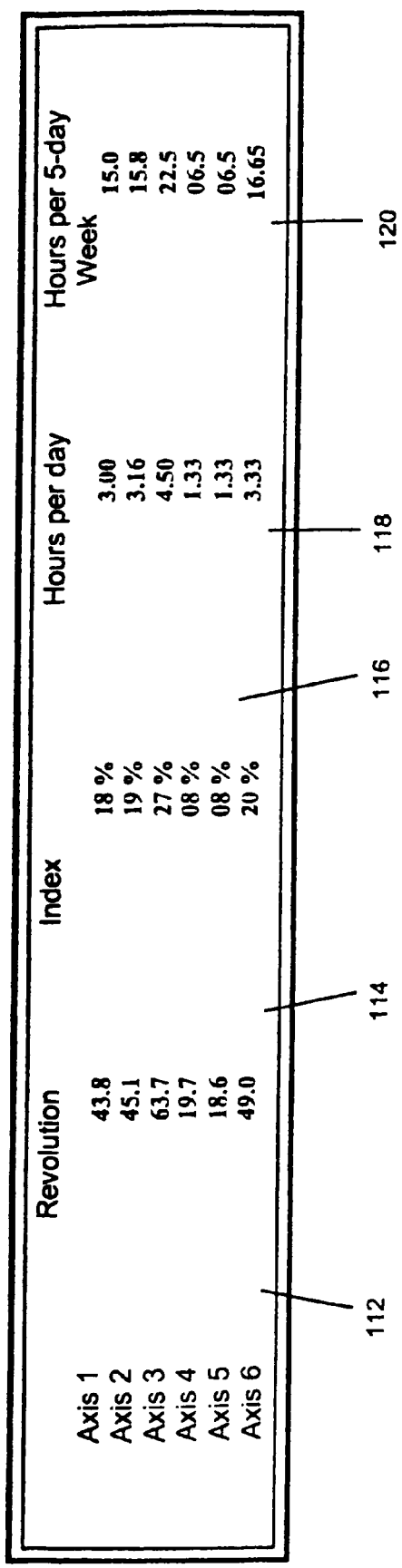
FIG. 7 is a table showing an example of assessment according to the invention of an assessment sequence.

The diagram 11 shows on the basis of the numerical example a graphic expression of the data according to the table 110 (FIG. 7). Shown for this purpose in the figure is a second table, the first table column of which contains the same indications as the first column. The same correspondingly applies to the second table column and the third table column, their content corresponding to the contents of the second column and the third column. Above the second table, the content of this table is expressed as a pie chart and is provided with an index, which identifies the segments, represented for example in color, of the pie chart with a name of an axis.

Once the first loading state has been determined on the basis of data of the torque profile, as explained in more detail in the first diagram 7, the state of wear has been determined on the basis of the existing mechanical backlash, as in the second diagram 9, and the second loading state has been determined on the basis of the movement sequence, as explained in the third diagram 11, it is then possible to carry out the assessment of the state of the at least one axial joint. For this purpose, first the individual states are pre-assessed. In a simple form of the method according to the invention, this results in that the state of wear, the first loading state and the second loading state are respectively provided with individual weighting factors, so that the states determined are in a specific relation to one another.

In the chosen example, a common assessment of all the states is to be carried out on this basis, so that a value for the assessed overall state is found by a mathematical summation of the pre-assessed individual states. This common value is then compared with a comparison value matrix, which has been empirically determined for this specific type of robot and empirically determined for the respective axial joint. The result of the comparison is a qualitative or quantitative statement concerning the state of the axial joint concerned.

A simple statement on the state of an axial joint would be, for example, that specific servicing work must be carried out. A further possibility is for a recommendation to be made as the result of the comparison, stating after how many further operating hours servicing work, and possibly which work, should be carried out. Yet another possibility is for a recommendation to be given on how the assessment program of the robot would have to be altered to change the loading of specific axial joints, in particular those which are moved particularly frequently or exposed to other particular loads, in order to apply greater loading to other axial joints, which are loaded less, in order in this way to achieve a more balanced, more uniformly distributed loading of all the axial joints overall.

Figure 2:
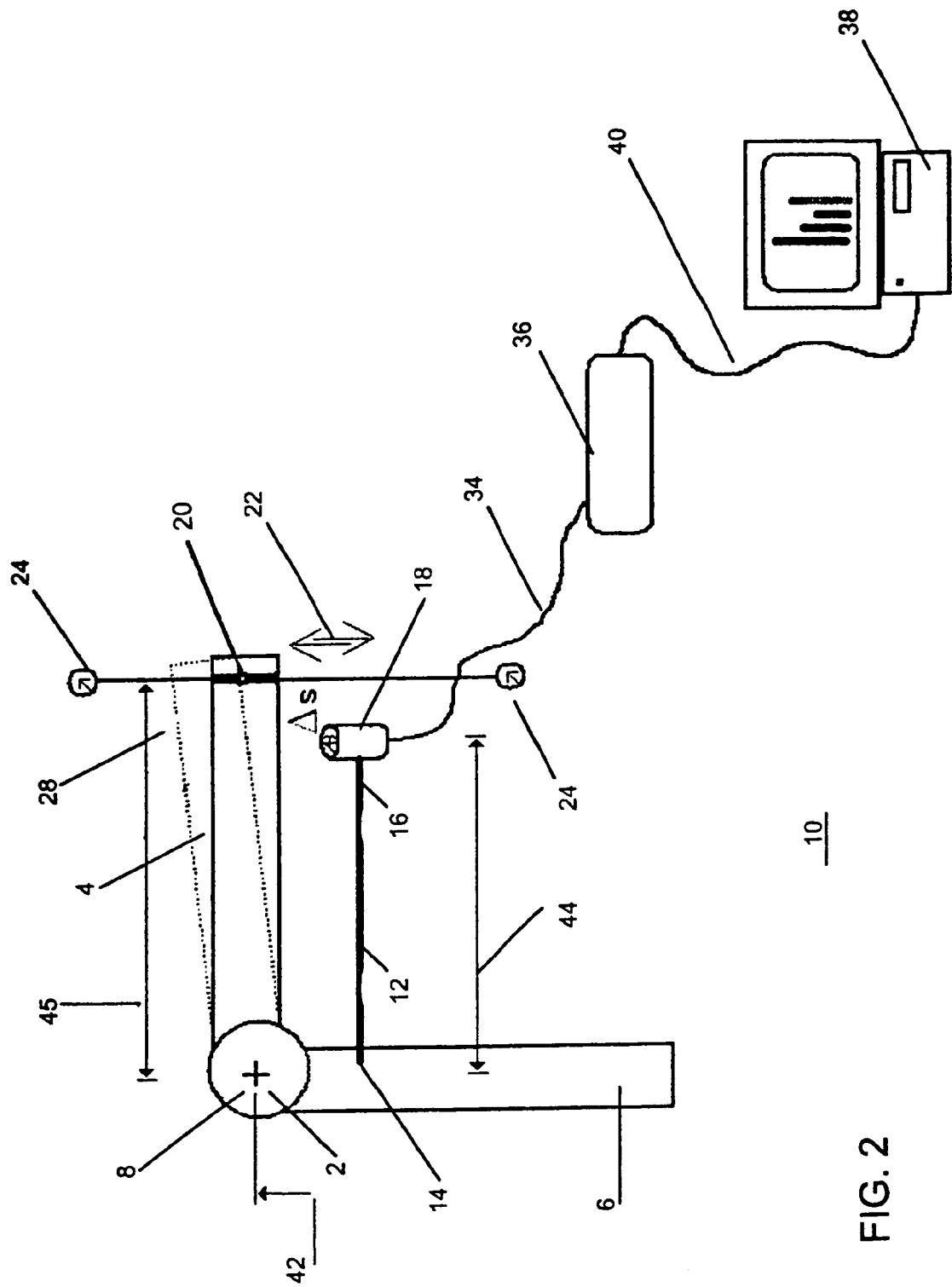
FIG. 2 is an illustration showing a first measuring configuration according to the invention for measuring transmission and bearing backlash.

FIG. 2 shows as an example a first measuring configuration 10 for a transmission backlash measurement on a multiaxial robot. Schematically shown for this purpose is an axial joint 2, which connects a first robot knuckle 4 and a second robot knuckle 6 rotatably movably about an axis 8. In the chosen example, the first robot knuckle 4 is intended here to represent the free end of the robot arm, while the second robot knuckle 6 is connected by further axial joints and further robot knuckles, which however are not represented here, to the robot foot, which in turn is fixedly connected to a foundation.

A holding bar 12 is fixedly connected by its first end 14 to the second robot knuckle 6. The connecting point is provided at a specific distance from the axis of rotation 8. At a second end, a displacement sensor 18 is disposed and aligned in such a way that the displacement measurement proceeds precisely in the plane of FIG. 2 and, moreover, as represented in FIG. 2, exactly perpendicularly to the longitudinal alignment of the first robot knuckle 4 in its starting position for the low backlash measurement. In the chosen example, the first robot knuckle 4 and the second robot knuckle 6 form a right angle to each other. In this arrangement, the holding bar 12 therefore runs exactly parallel to the starting position of the first robot knuckle 4.

Provided in the proximity of the free end of the first robot knuckle 4 is a connecting device 20. A non-illustrated load-transmitting device acts on the connecting device 20 and alternately applies a previously defined force as a load in the direction indicated in FIG. 2 by the first arrows 22.

The load-transmitting device itself is not shown in this figure, but the effects, that is the applied force on the first robot knuckle 4, are intended to be indicated symbolically by the joining lines between the connecting device 20 and two correspondingly arranged corner force measuring instruments 24. In the chosen example, the force is applied to the first robot knuckle by tensile forces, for example cables acting on it. However, it is also quite conceivable for compressive forces or a mixture of compressive and tensile forces also to be introduced into a robot knuckle by corresponding pneumatic or hydraulic or electrohydraulic or just electric drives.

The chosen type of representation makes it particularly easy to see that the distance of the point of introduction of the force from the axis of rotation 8, referred to here as the first distance 26, must be chosen in dependence on the force applied, on account of the leverage produced, or the torque on the axial joint 2. The force to be applied is preferably chosen such that on the one hand a transmission of the axial joint 2 is respectively brought into its end positions corresponding to the existing backlash, depending on the direction of the force, on the other hand a deformation of the first robot knuckle 4 falsifying the measurement is avoided.

In order to indicate this, a deflected position 28 has been represented as a dotted outline of the first robot knuckle 4 in a maximum deflected position, in the case where the applied force is applied by the load-transmitting device exactly in the direction indicated by the second arrow 30.

The displacement sensor 18 is connected to a measuring transducer 36 by a measuring line 34. In the example represented, the measuring transducer 36 has a number of functions. The displacement sensor 18 is an analog signal transmitter, so that one of the tasks of the measuring transducer 36 is to convert the analog signal into a digital output signal and so make it available to an evaluation device. In this example, the output device is a measuring computer 38, connected to the output of the measuring transducer 36 by a second measuring line 40. The second measuring line may, however, already be a data connecting line, for example in the case where the measuring transducer 36 is likewise a measuring computer and the output data have already been prepared for a prescribed or otherwise defined data protocol. This has the special advantage that the measuring transducer 36 can then be used universally and so various bus systems or else various displacement sensors can be connected to the measuring transducer, without this device having to be structurally changed. On the other hand, a very flexible setup of the evaluation as such is made possible by such an arrangement. Apart from the measuring computer 38 represented, it is possible for example to feed the output signal of the measuring transducer 36 into an instrumentation and control system or into a measuring system and, for example, for it to be transmitted also to a more remote place in a measuring station or even over a data line or corresponding link via telecom lines and the Internet to, in principle, any location worldwide.

On the basis of the above measuring configuration according to the invention for transmission backlash measurement at an axial joint of a robot, the form of the transmission backlash measurement according to the invention is to be explained in more detail.

The load-transmitting device initially applies a force to the first robot knuckle 4 in one of the directions as indicated by one of the first arrows 22. On account of the effect of the force, the first robot knuckle 4 is then deflected from its load-free position and slightly displaced in the tensile direction of the force. By use of the force measuring instrument 24 which is disposed on the side of the force acting, the force is continuously measured and the load-transmitting device is in this way restricted to a maximum amount in that the force measuring instrument sends an acknowledgement to the load-transmitting device concerning the currently prevailing loading of the first robot knuckle 4. The deflection process is sensed in terms of the distance covered by the displacement sensor 18. In the chosen example, the displacement sensor 18 is an ultrasonic sensor, which senses even small differences in the distance covered with adequate accuracy. The displacement sensor 18 is rigidly connected to the second robot knuckle 6 by the holding bar 12. The first end 14 is spaced away from the axis of rotation 8 by a first distance 42. Similarly, a second distance 44 is predetermined by the length of the holding bar 12, so that the position of the displacement sensor 18 is exactly determinable.

The load-transmitting device maintains the predetermined load on the first robot knuckle 4 for a moment while the measurement is being continuously performed. After a certain time, the load is removed from the first robot knuckle and the load-transmitting device then applies a force in exactly the opposite direction to that previously applied to the first robot knuckle 4. The deflection consequently then takes place in exactly the opposite direction. This process is also sensed by the displacement sensor 18. As already before, here too the force actually applied is sensed by the force measuring device 24 and restricted to a predetermined maximum.

The data sensed by the displacement sensor 18 are passed on to the measuring transducer 36, which converts the analog signals received from the displacement sensor 18 into digital signals that can be used by the measuring computer 38.

The measuring computer 38 then calculates on the basis of the geometrical arrangement data and the measured values of the displacement sensor, that is the measured deflection in both directions in which the load was applied to the first robot knuckle 4, an actually existing backlash at the axial joint 2; on account of the loading direction chosen in this example, the calculated backlash is the transmission backlash, that is to say that backlash which is present in the direction of rotation of the axial joint 2. The account taken of the geometrical arrangement data is explained in more detail with respect to FIG. 4. In the case of this configuration, however, it is of advantage that the displacement sensor 18 is aligned exactly with a measuring line which corresponds to the expected directions of deflection of the robot knuckle and, on account of the skilful choice of the directions in which the force acts, is aligned exactly tangential to the directions of rotation of the axis of rotation 8 of the axial joint 2. In order to eliminate unnecessary possible sources of error, the load-transmitting device also likewise acts in each case in both directions of the measuring line when it is applying its alternating load to the first robot knuckle 4. Possible errors in the alignment of the displacement sensor 18, that is an angular error in the alignment with respect to the measuring line and the direction of the deflection of the first robot knuckle 4, can likewise be balanced out by the evaluation device by the correspondingly performed measurement of the geometrical arrangement data of the displacement sensor.

Figure 3:
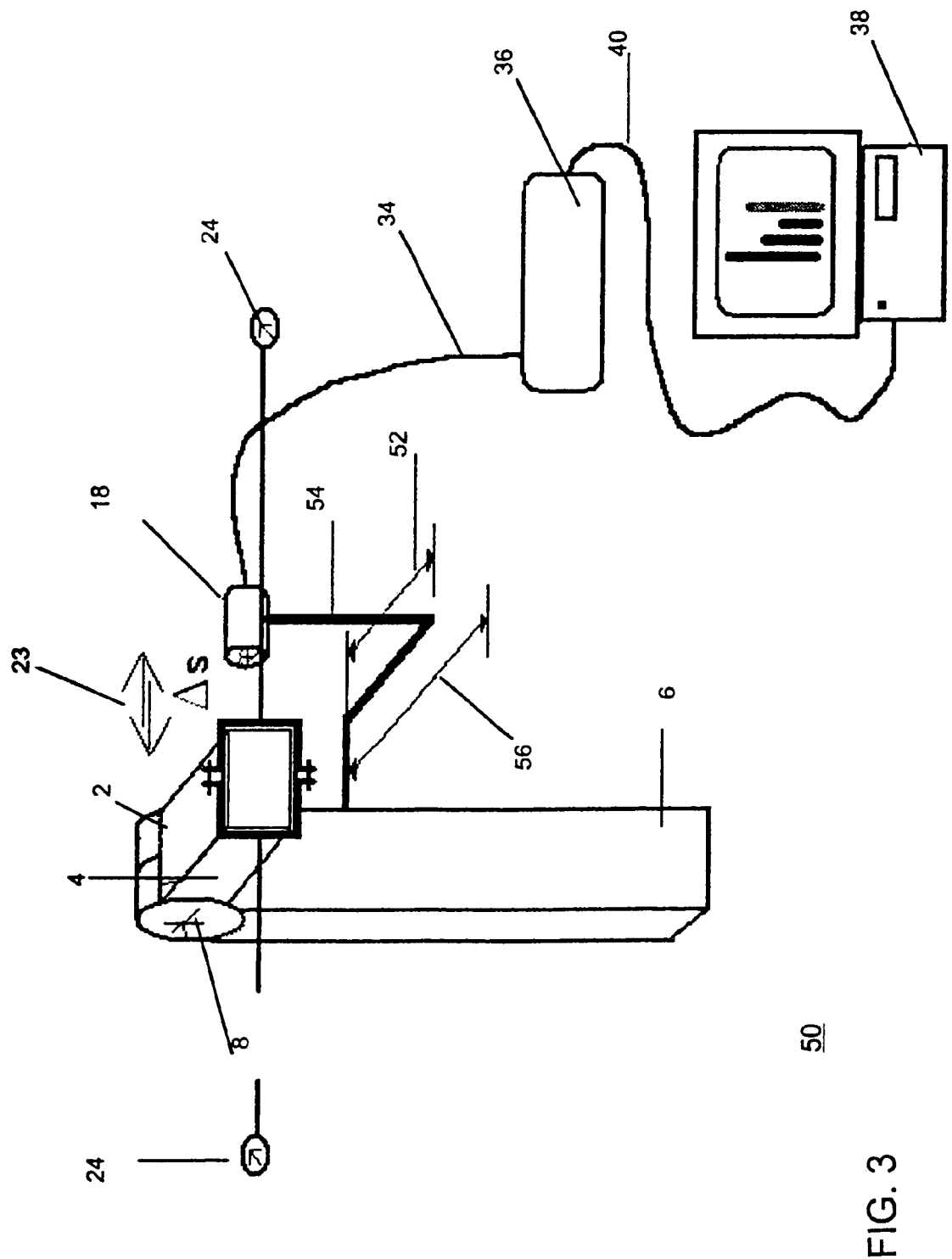
FIG. 3 is an illustration showing a second measuring configuration according to the invention for measuring the transmission and bearing backlash.

FIG. 3 shows a second measuring configuration 50, which is constructed in a way similar to the first measuring configuration 10, for which reason the same designations as in FIG. 1 are also used for identical components.

As a difference from FIG. 2, however, FIG. 3 shows a backlash measurement of the bearing backlash at the axial joint 2, that is to say that the measuring direction runs along the measuring line of the displacement sensor 18 exactly parallel to the axis of rotation 8 of the axial joint 2, to be precise exactly at a third distance 52, the distance corresponding to the clear distance between the displacement sensor 18 and the axis of rotation 8.

In FIG. 3, the displacement sensor 18 is kept in position by a second holding bar 54, the one end of which is in turn attached to the second robot knuckle 6 and the second end of which is connected to the sensor 18, the second holding bar 54 making it possible, as a difference compared to FIG. 2, for the displacement sensor 18 to be positioned as desired in all three spatial directions by two changes in spatial direction. In this case, the distance of the displacement sensor 18 from the first robot knuckle 4, that is in the direction of the axis of rotation 8, can be set by a first piece of the second holding bar 54, which is connected to the second robot knuckle 6. The clear distance between the displacement sensor 18 and the axis of rotation 8 is set by a second piece, which has the third distance 52 as its length. Finally, the still remaining third spatial direction can be set by a third piece of the second holding bar 54, which bears the displacement sensor 18 at its free end, so that the displacement sensor 18 is aligned with a specific distance from the first robot knuckle 4, the deflection of which this time however is of a parallel direction with respect to the axis of rotation 8 of the axial joint 2.

Accordingly, the non-illustrated load-transmitting device acts on the first robot axial joint along a parallel line with respect to the axis of rotation 8, the torque applied by the load-transmitting device being determined in each direction in which a load is applied not only by the applied maximum force F but also by a fourth distance 56, the magnitude of which is determined by the clear distance between the connecting device 20 and the axis of rotation 8.

The point of application of the load-transmitting device for introducing the alternately applied force; the connecting device is configured here as a clip, which encloses the first robot knuckle 4 with force closure and via which the load-transmitting device introduces forces into the first robot knuckle 4 for the movement of the latter back and forth, shown by the second arrows 23.

Figure 4:
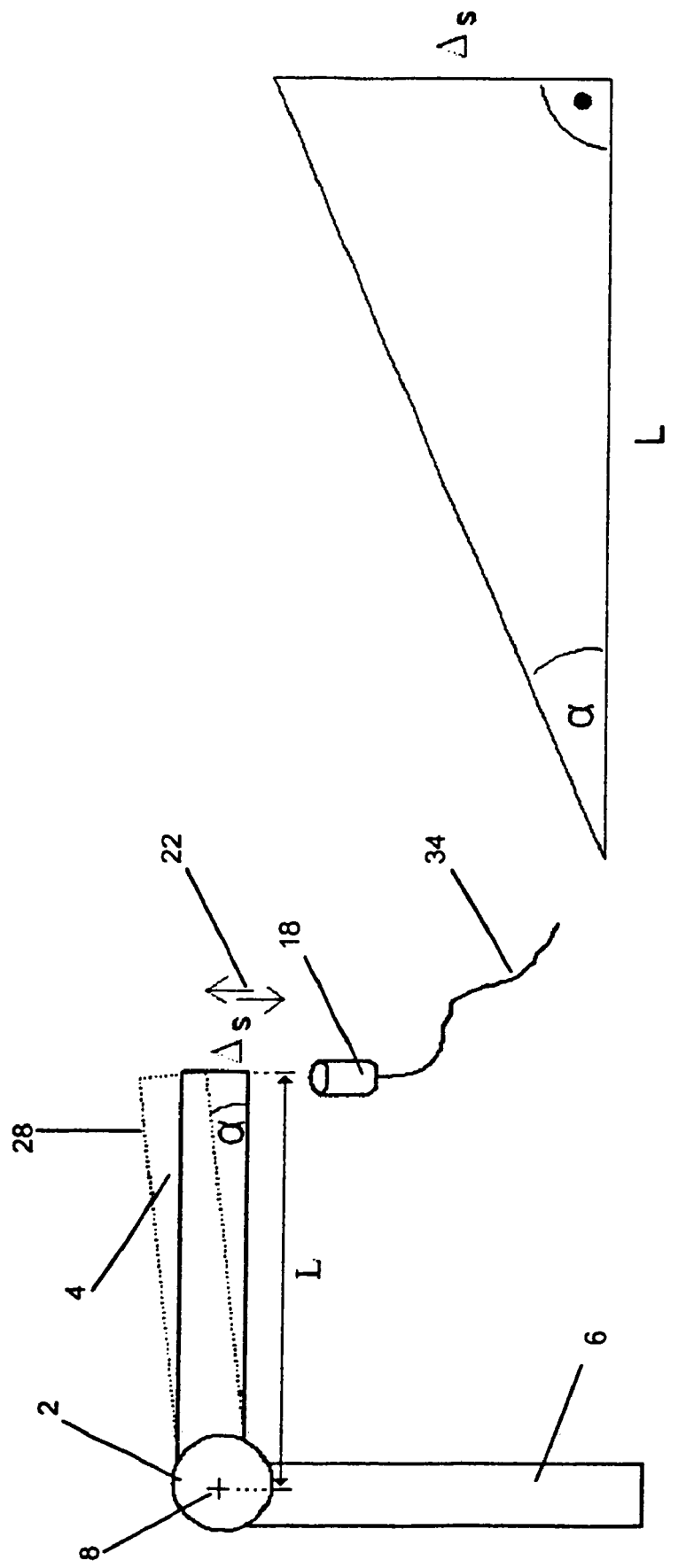
FIG. 4 is a diagram showing a measuring principle of the measuring configuration.

FIG. 4 relates to FIG. 1 and represents the corresponding situation for a transmission backlash measurement at the axial joint 2 in the left half of FIG. 4. Therefore, the same designations as in FIG. 1 have also been used for comparable components. Again, the first robot knuckle 4 is shown in its unloaded starting position, horizontal in FIG. 4, and in the upper deflected position 28.

In this case, the displacement sensor 18 is away from the axis of rotation 8 at a distance L. The first robot knuckle 4 is also brought into the deflected position 28 by an angle α by a powered unit of the load-transmitting device. A displacement distance ΔS thereby covered, as seen along the measuring line of the displacement sensor 18, corresponds approximately to the distance actually covered by the first robot knuckle 4.

A small difference between the displacement distance actually covered by the robot knuckle 4 and the depicted displacement distance ΔS is constituted by the fact that the first robot knuckle 4 is forced by the rotation about the axis of rotation 8 onto a circular arc, which however is used, by approximation, in the form of a right-angled triangle for a calculation. The triangle as a basis for calculation is once again diagrammatically represented in the right half of FIG. 4. In this case, the angle α is exaggerated. The angle α is usually a very small angle in the range of degrees.

Accordingly, the calculation of the angle α can be represented by approximation as follows:

$$\alpha \text{ (in degrees)} = \arctan \Delta S/L.$$

This equation can be further improved by inserting correction factors.

It can be seen well from FIG. 4 that the displacement sensor 18 must merely measure the difference in displacement ΔS to arrive at a specified angular value, which is dependent on geometrical arrangement data alone. If with respect to the application of a force by the load-transmitting device it is also ensured that there is applied to the first robot knuckle only such a force that the transmission backlash is just detectable, without the bending of the robot knuckle 4 caused by exposure to the force reaching an appreciable value that could influence the measurement, the measuring configuration then provides a very accurate calculation basis for the calculation of the backlash.

In the further case of bearing backlash measurement, as represented in FIG. 2, there is no need for a comparable transformation of the deflected distance ΔS measured by the displacement sensor 18 to an angular figure. This is so because a possible bearing backlash at the axial joint 2 is expressed in a parallel displacement of the entire second robot knuckle 4 under the effect of the force of the load-transmitting device. However, the possible bending of the first robot knuckle 4 has to be taken into account.

Figure 5:
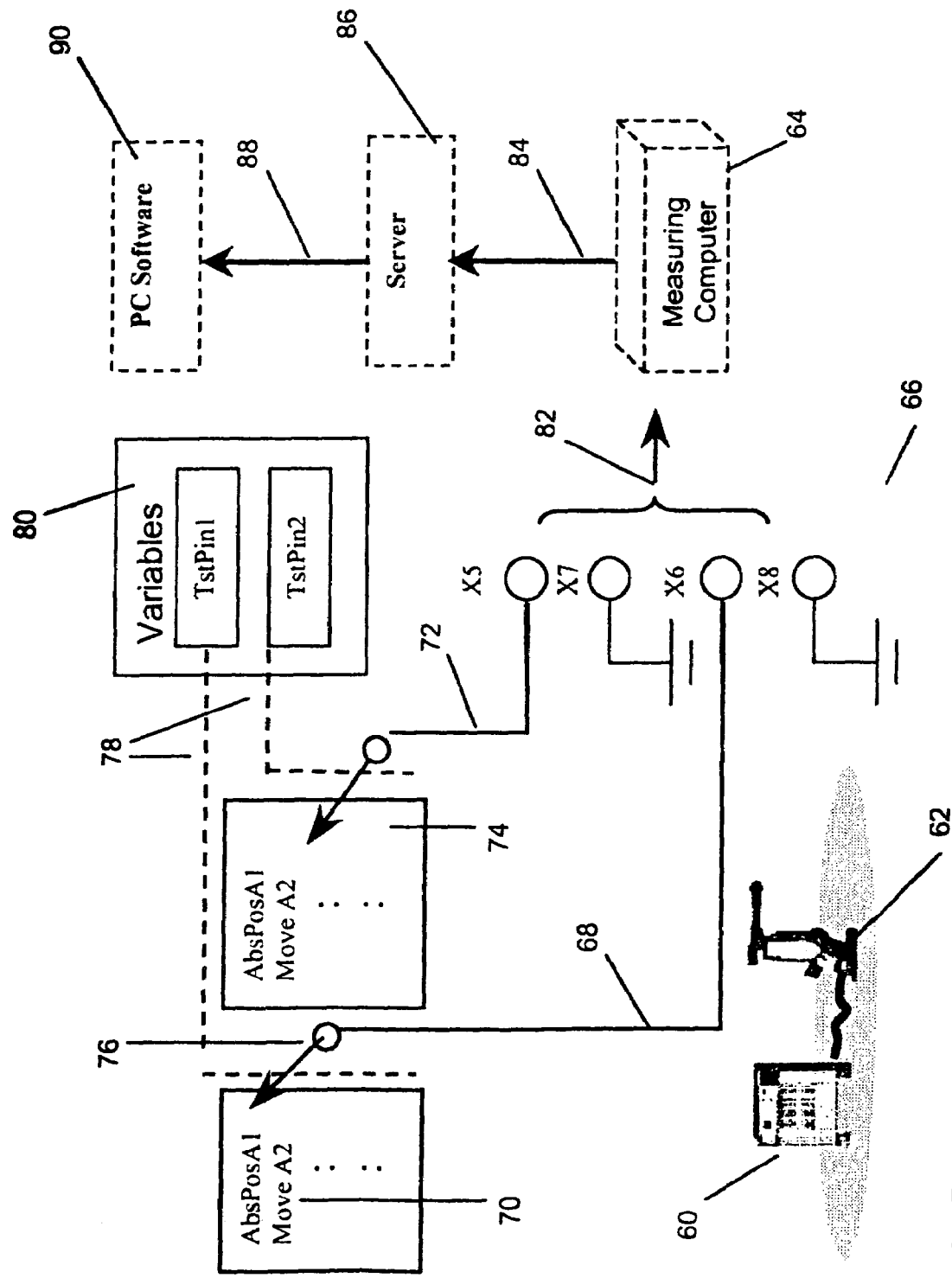
FIG. 5 is a block diagram of a system setup according to the invention.

FIG. 5 shows the example of a connection possibility between a robot controller 60, which controls a robot 62, and a first system for wear appraisal 64. An interface 66 between the robot controller 60 and the first system 64 is bordered by a frame of dashed lines and contains a number of interface points, which are denoted by X5, X6, X7 and X8. The interface 66 is in this case provided for tapping two robot axes, it being quite conceivable for a large number of signals of different axes to be sampled or removed via the interface.

In the chosen example, the side of the interface 66 on which the robot 62 and its controller 60 are located is represented by the representation of the symbols for a robot 62 and its robot controller 60. On this side of the interface 66, a first data line 68 connects the connection point X6 to a first data selection switch 70 of the robot controller 60. In a comparable way, the connection point X5 is connected by a second data line 72 to a second data selection switch 74. Via a switching element 76, the first data line 68 can be switched either to a signal of an absolute position of a first robot axis A1 or a torque signal of the first axis A1. In the chosen example, the switching element 76 connects the data line 68 to the absolute position of the first axis A1.

As a difference from this, the second data line 72 is connected to the torque signal for a second axis A2 of the robot 62.

The chosen example therefore shows the wiring of the interface 66 to data from the robot controller 60 merely concerning one axis. It is quite conceivable for the data of a number of axes or all the axes of the robot 62 to be connected to a corresponding interface. The advantage of this wiring is that, in comparison with the absolute position of the axis, which represents the position in the current program which the robot 62 has to execute, a corresponding torque value can be respectively assigned.

For test purposes, as to whether the signals made available can also be transmitted without any errors to the interface 66, the first data selection switch 70 and the second data selection switch 74 are respectively connected to a testing device 80 by the third data lines 78.

The interface 66 is also connected to the measuring computer 64, which is indicated by a first arrow 82. Furthermore, the measuring computer is connected by a fourth data line 84 to a server 86 and the latter is connected by a fifth data line 88 to a PC 90. In the example represented, the measuring computer has the task of interpreting the values of the robot axis made available at the interface in analog form as values for a torque profile. The values prepared by the measuring computer 64 for the torque profile are transmitted to the PC 90 through the fourth data line 84, the server 86 and also the fifth data line 88.

With the arrangement represented in FIG. 5, the method according to the invention proceeds as follows. Data signals which are to be assessed as the absolute position of the first axis A1 are made available by the robot controller 60 at the connection point X6 via the first data line 68. In a comparable way, a value for the torque just applied at the first axis of the robot 62 is set up by the robot controller 60 via the second data line 72. Both values are sensed together with a timing signal by the measuring computer 64 and initially stored. The signal value for the absolute position of the first axis of the robot 62 is not absolutely necessary for the method according to the invention, but simplifies the interpretation of the measured values for the torque for an expedient form of the method according to the invention.

It is just as unnecessary that the measuring computer stores the data received. These data could also be further processed immediately, that is online, and transmitted to the PC 90.

However, here too it is expedient initially to store the measured values received for comparison purposes or for later comparative calculations, in order in this way also to have a copy of the original data available.

In this way, the entire torque profile of a complete working cycle of the robot 62 is transmitted to the PC. The latter also initially stores the received torque profile of the first axis. In the chosen example, the working cycle of the robot 62 is to comprise, in the first step, the action of moving to and gripping a work piece. The second working step is the action of raising the work piece and subsequently bringing it to an end position for the work piece. Finally, the third working step for the robot 62 consists in that the work piece is released and the robot arm is moved back into its starting position, so that the then completed working cycle could be repeated.

The working cycle defined by the working steps is initially represented as a torque profile on the display device of the PC 90. Each portion of the torque profile that exceeds a previously fixed torque band, that is permissible minimum and maximum values for the torque band of this axis, is analyzed as such and undergoes an assessment in a subsequent method step. In a simple assessment step, the frequency with which the torque band is left within a specific time, predetermined by the working cycle, is used as a measure for the assessment. Another possibility is that the curve profile in an analyzed portion of the torque profile is used for the assessment. Altogether, the frequency and/or the curve profile of the portions of the torque profile, possibly additionally provided with an empirically determined factor, is or are used to appraise the current axial wear caused by such a working cycle. The simplest axial wear that can be appraised by the method according to the invention is therefore axial wear per working cycle. With the knowledge of the previously completed working cycles of the robot 62, the current state of wear of the robot 62, or of the first axis concerned, is then also concluded according to the invention. On the basis of this appraisal, a statement relating to the time period for which this robot axis can continue to be operated with the present working cycle is then also made possible.

Figure 6:
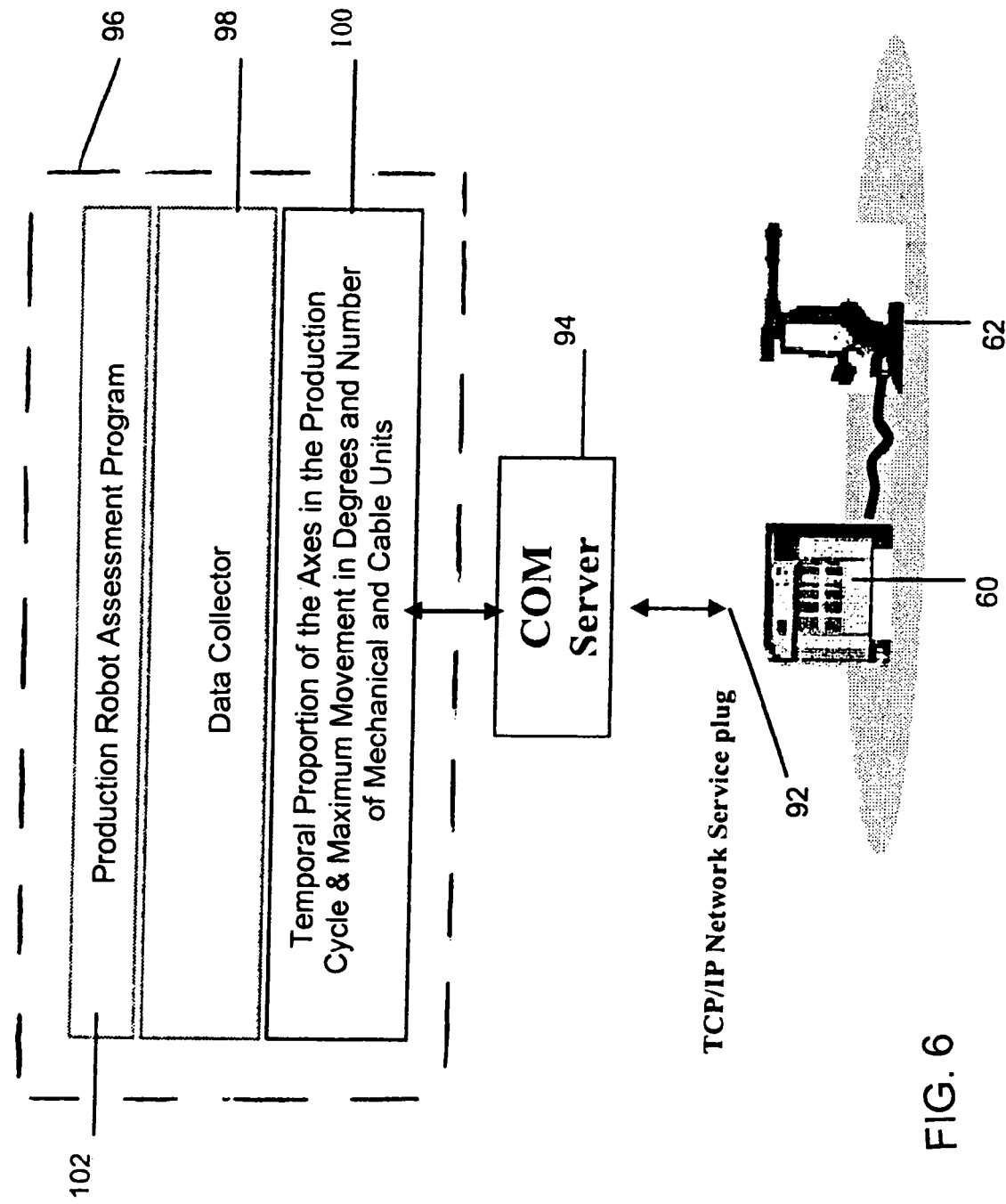
FIG. 6 is a block diagram showing an example of a data structure according to the invention.

FIG. 6 shows the example of a data flow from the robot controller 60 of the robot 62 via a TCP/IP interface 92, through which the data can be fed from the robot controller 60 to a TCP/IP server with a network 94. A TCP/IP network 94 therefore connects an evaluation device 96 to the robot controller 60. This example shows that the evaluation device 96 can be connected from the robot controller 60 location-independently by the network 94. In the chosen example, this is a TCP/IP network. However, it is equally conceivable for the interface 92 to be integrated into other networks, for example for the interface 92 to be an Internet interface, so that the network 94 is formed by the Internet, and the evaluation device 96 can consequently be anywhere in the world without local restriction.

In the chosen example, the system according to the invention for the wear appraisal of axes of a robot arm of an industrial robot is realized with all its modules in the evaluation device 96. The torque profile is accordingly passed in the form of the data made available to the robot controller 60 from the interface 92 via the network 94 to the evaluation device 96. There, the data obtained are initially received by a data collector 98 and recorded and possibly stored as torque data or other data, in particular also in a temporal relationship. In this way, it is possible for a processing module 100 to interpret the data made available by the data collector 98 as torques for a torque comparison, for the maximum value detection and for the representation of the data as curves. In a further module, an assessment module 102, the curve, the curve profile or specific aspects of the curve are assessed as wear, so that, at the end of the method according to the invention, a statement can be made concerning the extent to which a specific axis of the robot 62 is exposed to particular, abnormal loads or loads exceeding specific permissible loads and of such a nature that particular wear is to be expected. These data with other data from production, servicing or the robot movement program, as indicated in FIG. 6 as the assessment or movement module 102, altogether improve the quality of the statement concerning the wear appraisal or the state of the individual axes.

FIG. 7 shows a table 110, which contains data given by way of example for a six-axis robot, which originate from a production program that has a cycle time of 60 seconds and works 1000 cycles every 24 hours. A first column 112 thereby designates the respective robot axes 1 to 6, the axes concerned being assigned the following values row by row. The second column 114 indicates for each axis an absolute value for the established revolutions of the respective axis, which have been established within a cycle time of the production program. In a third column 116, the revolution values are entered as index values, that is percentage values as proportionate use of the respective axes, the sum of all the percentage values indicated amounting to 100%. In a fourth column 118, the absolute temporal values of the respective axis within a day are noted and, finally, in a fifth column 120, the absolute times of use of an axis during a working week, that is a week with five days, are indicated by a number of hours.

With the table 110 it is intended to make it clear that the data required according to the invention, of a movement sequence of axes of a robot, are used initially to establish the rotational movements of the respective axes. However, the final method step of the method according to the invention is not evident from this table. On the basis of the indication given in the third column 116 of the percentage of the revolutions of each axis as a proportion of the total number of revolutions, it is now possible however to perform an assessment of the established rotational movements of each axis in various ways.

One possibility is to make the axis that is subjected to the greatest loading, that is the axis 3 in the chosen example, the decisive axis, so that the calculation of the servicing interval is carried out on the basis of the 27% proportion of the total number of revolutions or on the basis of the absolute numbers of revolutions, that is here 63.7 revolutions for the axis 3, and to determine in this way, together with the historical data, that is the data indicating how many cycles have already been performed by the robot, in comparison with the recommended maximum number of revolutions according to the manufacturer's specifications for when servicing is next due, the servicing interval as such or the remaining time period before a next servicing time.

On the basis of the numerical example from FIG. 1, the data are graphically expressed according to the table 110. For this purpose, in FIG. 1 there is shown a second table 100, the first table column 102 of which contains the same indications as the first column 112. The same correspondingly applies to the second table column 104 and the third table column 106, their content corresponding to the contents of the second column 114 and of the third column 116. Above the second table 100, this table is expressed as a pie chart 108 and provided with an index 110, which identifies the segments represented in color with a name of an axis.

This application claims the priority, under 35 U.S.C. § 119, of German patent application No. 10 2004 028 557.8, filed Jun. 15, 2004; the entire disclosure of the prior application is herewith incorporated by reference.

We claim:

1. A method for assessing a state of at least one axial joint of an industrial robot, which comprises the steps of:
   determining a state of wear of the at least one axial joint on a basis of data of a mechanical backlash present at the at least one axial joint of the industrial robot;
   determining a first loading state of the at least one axial joint on a basis of data of a torque profile of the at least one axial joint during at least one first working cycle of the industrial robot;
   determining a second loading state of the at least one axial joint on a basis of data of a movement sequence of the at least one axial joint during at least one second working cycle of the industrial robot; and
   carrying out an assessment of the state by pre-assessing the state of wear, the first loading state, and the second loading state and a subsequent comparison of the first loading state and the second loading state with an empirically obtained comparison value matrix, for assessing the state of the at least one axial joint.

2. The method according to claim 1, which further comprises deriving the data for determining the state of wear by performing a backlash measurement.

3. The method according to claim 1, which further comprises:
   applying, through a load-transmitting device, a predetermined force alternately along a measuring line to a first robot knuckle, the first robot knuckle movably connected in a direction of rotation by the axial joint to a second robot knuckle;
   measuring a deflection of the first robot knuckle at a predetermined distance from an axis of rotation of the axial joint with a displacement sensor; and
   calculating a rotational angle of the first robot knuckle as a measure of a backlash present at the axial joint with an evaluation device connected to the displacement sensor, taking into account geometrical configuration data in the measurement of the displacement sensor and the industrial robot and also a measured deflection.

4. The method according to claim 1, which further comprises using at least one working cycle for obtaining the data for the torque profile and the movement sequence.

5. The method according to claim 1, which further comprises:
   analyzing the torque profile for portions of the torque profile that exceed a previously fixed torque band; and
   determining the first loading state of the at least one axial joint by assessing a frequency and/or a curve profile of the portions of the torque profile.

6. The method according to claim 1, which further comprises:
   determining rotational movements of the at least one axial joint on a basis of the data of movement sequence being a rotational movement profile; and
   determining the second loading state for the at least one axial joint by assessing the rotational movements.

7. The method according to claim 1, which further comprises performing pre-assessments using a respectively empirically determined weighting factor.

8. A system for assessing a state of at least one axial joint of a robot arm of an industrial robot, the system comprising:
   a data module containing data of an existing mechanical backlash, a torque profile and a movement sequence of at least one axial joint during at least one working cycle of the industrial robot;
   an analysis module for determining loading states and/or states of wear of the at least one axial joint on a basis of the data; and
   an assessment module for assessing the loading states and the state of wear of the at least one axial joint, said assessment module performing a subsequent comparison of the first loading state and the second loading state with an empirically obtained comparison value matrix, for assessing the state of said at least one axial joint.

9. The system according to claim 8, wherein at least one of said data module, said analysis module and said assessment module is disposed in a robot controller.

10. The system according to claim 8, further comprising an evaluation device to be connected to a robot controller, and at least one of said data module, said analysis module and said assessment module is disposed in said evaluation device.

11. The system according to claim 8, wherein values of the torque profile and/or of the movement sequence can be read out from a robot controller as direct or indirect values.

12. The system according to claim 10, further comprising:
    a measuring configuration for measuring backlash at the axial joint of the industrial robot, the industrial robot having a first and a second robot knuckle movably connected to each other in a direction of rotation by the axial joint;
    a load-transmitting device applying a predetermined force alternately along a measuring line to the first robot knuckle; and
    a displacement sensor measuring deflection of the first robot knuckle brought about by an application of the predetermined force, said displacement sensor positioned in a measuring manner in a direction of the measuring line, and said displacement sensor disposed at a predetermined distance from an axis of rotation of the axial joint.

13. The system according to claim 8, further comprising a display device for displaying measured values.

14. The system according to claim 12, wherein said displacement sensor is connected to said evaluation device.

15. The system according to claim 12, further comprising a measuring transducer connected between said displacement sensor and said evaluation device.

16. The system according to claim 10, wherein said evaluation device is a measuring computer having a display device.

17. The system according to claim 12, further comprising a holding device connected to the second robot knuckle, the second robot knuckle disposed between the axial joint and a robot foot, said holding device supporting said displacement sensor.

18. The system according to claim 15, further comprising computer program products by which a measurement and/or an evaluation of measured data is made possible are implemented in said evaluation device and/or in said measuring transducer.

19. The system according to claim 8, wherein said assessment module is programmed to perform a pre-assessment of the states of wear and of first and second loading states.

20. The system according to claim 13, wherein said display device is a screen.

21. The system according to claim 17, wherein said holding device is selected from the group consisting of a holding bar and a holding rod.

* * * * *